United States Patent
Chae et al.

(10) Patent No.: US 10,959,194 B2
(45) Date of Patent: Mar. 23, 2021

(54) METHOD AND APPARATUS FOR TRANSMITTING SIDELINK SIGNAL IN WIRELESS COMMUNICATION SYSTEM

(71) Applicant: LG Electronics Inc., Seoul (KR)

(72) Inventors: Hyukjin Chae, Seoul (KR); Hanbyul Seo, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/604,082

(22) PCT Filed: Apr. 10, 2018

(86) PCT No.: PCT/KR2018/004212
§ 371 (c)(1),
(2) Date: Oct. 9, 2019

(87) PCT Pub. No.: WO2018/190623
PCT Pub. Date: Oct. 18, 2018

(65) Prior Publication Data
US 2020/0154372 A1    May 14, 2020

Related U.S. Application Data

(60) Provisional application No. 62/502,609, filed on May 6, 2017, provisional application No. 62/483,882, filed on Apr. 10, 2017.

(30) Foreign Application Priority Data

Apr. 5, 2018 (KR) .................. 10-2018-0039450

(51) Int. Cl.
H04W 52/38    (2009.01)
(52) U.S. Cl.
CPC ................ H04W 52/383 (2013.01)

(58) Field of Classification Search
CPC ... H04W 52/383; H04W 72/02; H04W 72/04; H04W 74/0808; H04W 76/023; H04B 17/318
See application file for complete search history.

(56) References Cited

U.S. PATENT DOCUMENTS

| 9,516,638 | B2* | 12/2016 | Seo ................. H04L 1/0031 |
| 2013/0176864 | A1* | 7/2013 | Quan ................ H04L 1/0002 370/245 |

(Continued)

FOREIGN PATENT DOCUMENTS

WO    WO2016036141    3/2016

OTHER PUBLICATIONS

Qualcomm Incorporated, "Discussion on V2X Power Imbalance Parameter," R4-1700832, 3GPP TSG-RAN WG4 Meeting #82, Athens, Greece, dated Feb. 13-17, 2017, 3 pages.

(Continued)

*Primary Examiner* — Dong-Chang Shiue
(74) *Attorney, Agent, or Firm* — Fish & Richardson P.C.

(57) ABSTRACT

One embodiment of the present invention relates to a method for transmission a sidelink signal by a terminal in a wireless communication system, and the method comprises: a step of determining a transmission power of a physical sidelink control channel (PSCCH) and a physical sidelink shared channel (PSSCH); and a step of transmitting the PSCCH and the PSSCH with the determined transmission power, wherein the PSCCH and the PSSCH are frequency division multiplexed (FDM) in one subframe and transmitted, and when a modulation and coding scheme (MCS) or a modulation order is equal to or larger than a predetermined value, the power offset value for increasing the transmission (Continued)

power is not applied when determining the PSCCH transmission power. The terminal is included in an autonomous vehicle.

14 Claims, 13 Drawing Sheets

(56) References Cited

U.S. PATENT DOCUMENTS

| | | | | |
|---|---|---|---|---|
| 2017/0064248 | A1* | 3/2017 | Cheng | H04N 7/0125 |
| 2019/0097751 | A1* | 3/2019 | Li | H04J 13/0062 |
| 2019/0173612 | A1* | 6/2019 | Kimura | H04L 1/0063 |
| 2019/0356451 | A1* | 11/2019 | Zhang | H04W 52/383 |
| 2020/0068534 | A1* | 2/2020 | Li | H04W 72/12 |
| 2020/0100308 | A1* | 3/2020 | Lee | H04W 76/27 |

OTHER PUBLICATIONS

Qualcomm Inc., "Discussion on V2V Demodulation Performance," R4-1610429, 3GPP TSG-RAN WG4 Meeting #81, Reno, Nevada, USA, dated Nov. 14-18, 2016, 3 pages.
Intel Corporation, "V2V UE demodulation performance requirements," R4-1609083, 3GPP TSG-RAN WG4 Meeting #81, Reno, Nevada, USA, dated Nov. 14-18, 2016, 6 pages.
Huawei, HiSilicon, "Discussion on UE capability in decoding PSSCH and PSCCH," R1-1609361, 3GPP TSG RAN WG1 Meeting #86bis, Lisbon, Portugal, dated Oct. 10-14, 2016, 2 pages.
PCT International Search Report and Written Opinion in International Application No. PCT/KR2018/004212, dated Aug. 10, 2018, 16 pages (with English translation).
Extended European Search Report in European Application No. 18784062.4, dated Dec. 14, 2020, 8 pages.
Japanese Office Action in Japanese Application No. 2020-504085, dated Nov. 10, 2020, 6 pages (with English translation).
LG Electronics, "Discussion on 64QAM support," R1-1713089, 3GPP TSG RAN WG1 Meeting #90, Prague, Czechia, dated Aug. 21-25, 2017, 4 pages.
LG Electronics, "Discussion on 64QAM support," R1-1804512, 3GPP TSG RAN WG1 Meeting #92-bis, Sanya, China, dated Apr. 16-20, 2018, 5 pages.
Qualcomm Incorporated, "MPR for V2V," R4-167945, 3GPP TSG-RAN WG4 Meeting #80bis, Gothenburg, Sweden, dated Aug. 22-26, 2016, 4 pages.
Qualcomm Incorporated, "Remaining Issues in V2V RF Specifications," R4-1609952, 3GPP TSG-RAN WG4 Meeting #81, Reno, Nevada, USA, dated Nov. 14-18, 2016, 4 pages.

* cited by examiner (a)

(b)

(a)

(b)

us 10,959,194 B2

METHOD AND APPARATUS FOR TRANSMITTING SIDELINK SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2018/004212, filed on Apr. 10, 2019, which claims the benefit of Korean Application No. 10-2018-0039450, filed on Apr. 5, 2018, U.S. Provisional Application No. 62/502,609, filed on May 6, 2017, and U.S. Provisional Application No. 62/483,882, filed on Apr. 10, 2017. The disclosures of the prior applications are incorporated by reference in their entirety.

TECHNICAL FIELD

The following description relates to a wireless communication system and, more particularly, to a method and apparatus for determining a transmission power in a high modulation and coding scheme (MCS) level and transmitting a sidelink signal.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DETAILED DESCRIPTION OF THE INVENTION

Technical Problems

An object of the present disclosure is to provide processing of transmission powers of data and control information when the data and the control information are transmitted using frequency-division multiplexing (FDM) on sidelink, particularly, when a high MCS level or modulation order is used.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

According to an aspect of the present invention, provided herein is a method of transmitting a sidelink signal by a user equipment (UE) in a wireless communication system, including determining transmission powers of a physical sidelink control channel (PSCCH) and a physical sidelink shared channel (PSSCH); and transmitting the PSCCH and the PSSCH at the determined transmission powers, wherein a power offset value for increasing a transmission power is not applied upon determining the transmission power of the PSCCH, when the PSCCH and the PSSCH are transmitted using frequency-division multiplexing (FDM) in one subframe, and a modulation and coding scheme (MCS) level or a modulation order is a preset value or higher.

In another aspect of the present invention, provided herein is a user equipment (UE) for transmitting a sidelink signal in a wireless communication system, including a transmission device and a reception device; and a processor, wherein the processor determines transmission powers of a physical sidelink control channel (PSCCH) and a physical sidelink shared channel (PSSCH), and transmits the PSCCH and the PSSCH at the determined transmission powers through the transmission device, wherein a power offset value for increasing a transmission power is not applied upon determining the transmission power of the PSCCH, when the PSCCH and the PSSCH are transmitted using frequency-division multiplexing (FDM) in one subframe, and a modulation and coding scheme (MCS) level or a modulation order is a preset value or higher.

The preset value for the MCS level may be 64-quadrature amplitude modulation (QAM).

The PSCCH may have a size of two resource blocks (RBs).

At least a part of an available power when the power offset value is not applied upon determining the transmission power of the PSCCH may be allocated for increase in the transmission power of the PSSCH.

The size of the power offset value may be separately set according to whether the PSCCH and the PSSCH are continuously transmitted on a frequency axis.

If the MCS level or the modulation order is the preset value or higher, the PSCCH and the PSSCH may be transmitted in different subframes.

If the MCS level or the modulation order is the preset value or higher, an automatic gain control (AGC) period equal to or longer than a predetermined period may be used.

Advantageous Effects

According to the present disclosure, performance deterioration due to degradation of error vector magnitude (EVM) performance of transmission symbols on sidelink or in-band or out-band emission may be prevented.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the present disclosure and are incorporated in and constitute a part of this application, illustrate embodiments of the present disclosure and together with the description serve to explain the principle of the disclosure. In the drawings.

BEST MODE FOR CARRYING OUT THE INVENTION

Figure 1:
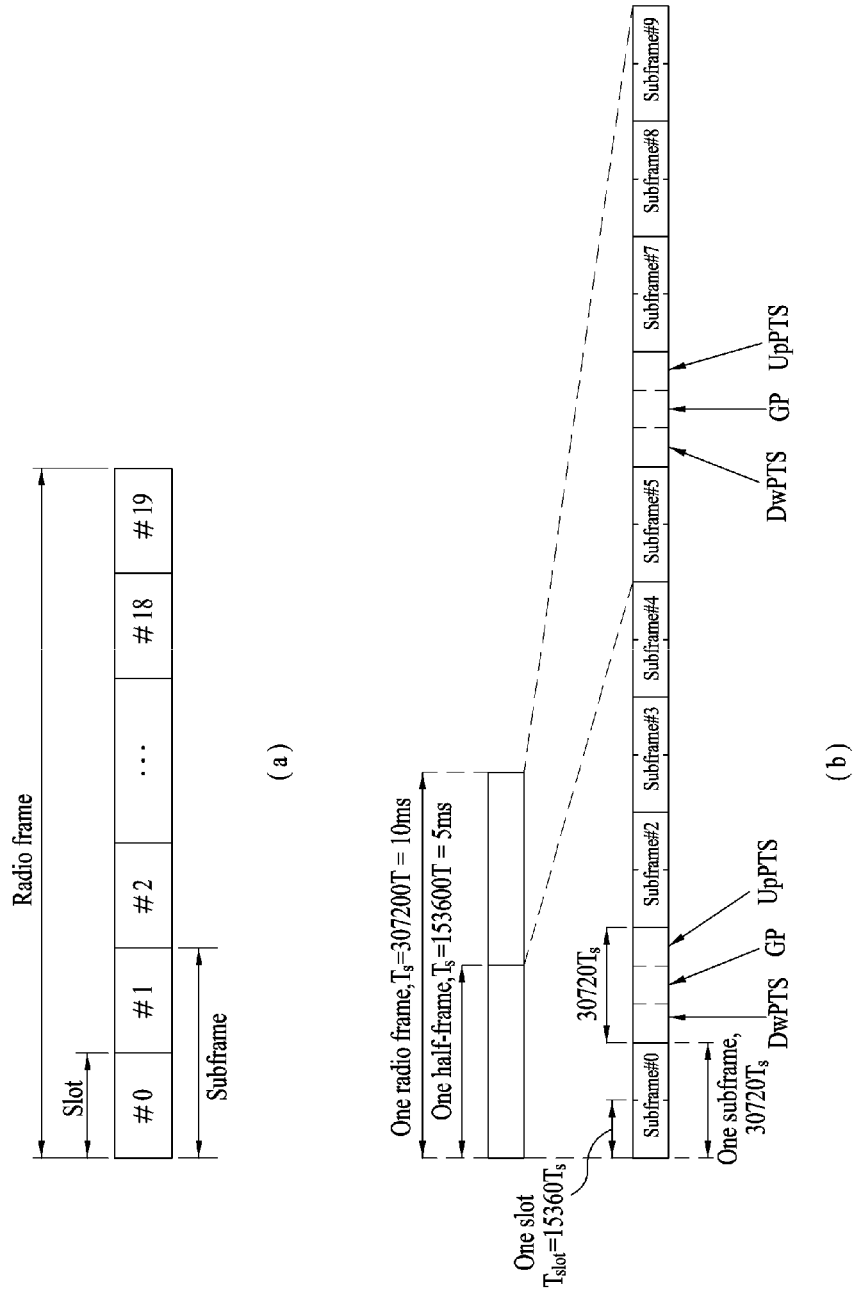
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
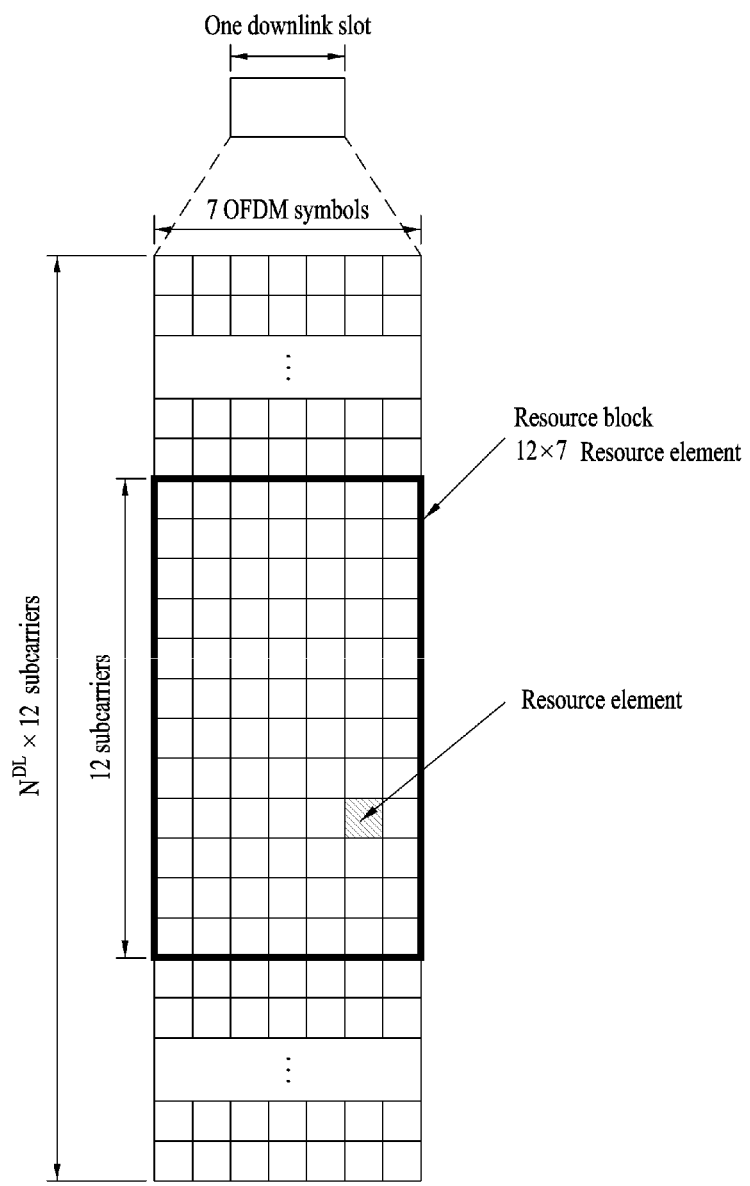
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
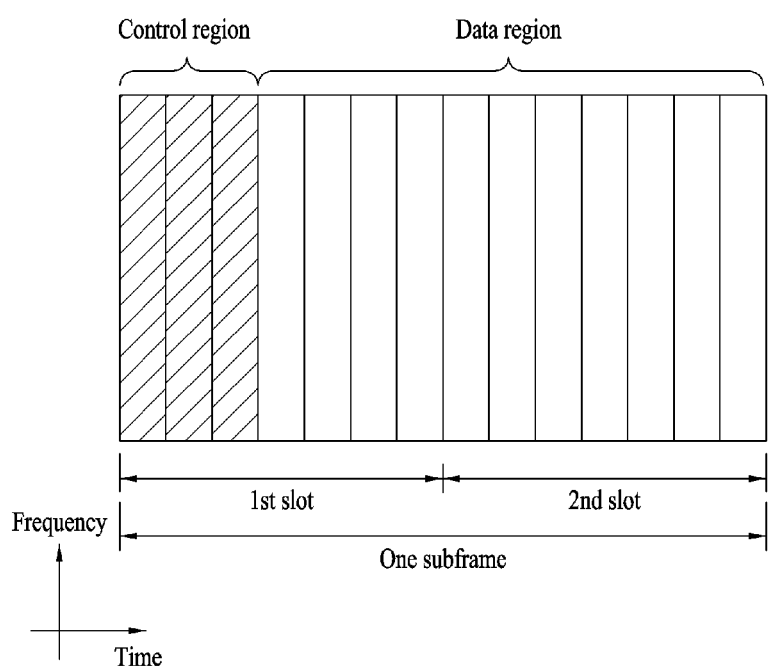
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
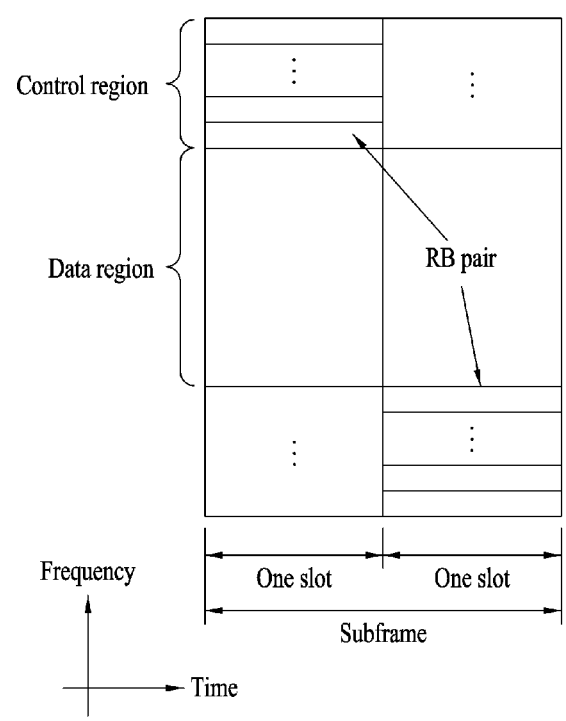
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:
 i) Demodulation-reference signal (DM-RS) used for channel estimation for coherent demodulation of information delivered on a PUSCH and a PUCCH; and
 ii) Sounding reference signal (SRS) used for an eNB or a network to measure the quality of an uplink channel in a different frequency.

The downlink RSs are categorized into:
 i) Cell-specific reference signal (CRS) shared among all UEs of a cell;
 ii) UE-specific RS dedicated to a specific UE;
 iii) DM-RS used for coherent demodulation of a PDSCH, when the PDSCH is transmitted;
 iv) Channel state information-reference signal (CSI-RS) carrying CSI, when downlink DM-RSs are transmitted;
 v) Multimedia broadcast single frequency network (MBSFN) RS used for coherent demodulation of a signal transmitted in MBSFN mode; and
 vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
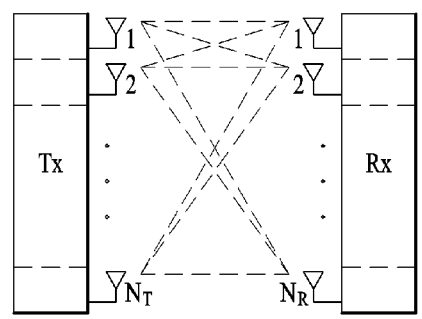
FIG. 5 is a view illustrating the configuration of a wireless communication system having multiple antennas.
Figure 5:
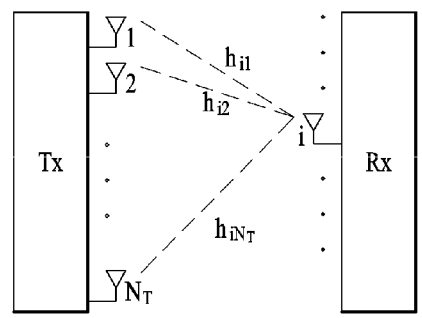

FIG. 5 is a diagram illustrating a configuration of a wireless communication system having multiple antennas.

As shown in FIG. 5(a), if the number of Tx antennas is increased to NT and the number of Rx antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT Tx antennas and NR Rx antennas.

Regarding a transmitted signal, if there are NT Tx antennas, the maximum number of pieces of information that can be transmitted is NT. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & 0 \\ & P_2 & \\ & & \ddots \\ 0 & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2 \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $w_{ij}$ denotes a weight between an ith Tx antenna and jth information. W is also called a precoding matrix.

If the NR Rx antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the NT Tx antennas to the Rx antenna i. The channels may be combined and expressed in the form of a vector and a matrix. In FIG. 5(b), the channels from the NT Tx antennas to the Rx antenna i can be expressed as follows.

$$h_i^T = [h_{i1}, h_{i2}, \ldots, h_{iN_T}] \quad \text{[Equation 7]}$$

Accordingly, all channels from the NT Tx antennas to the NR Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the NR Rx antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

Meanwhile, the number of rows and columns of the channel matrix H indicating the channel state is determined by the number of Tx and Rx antennas. The number of rows of the channel matrix H is equal to the number NR of Rx antennas and the number of columns thereof is equal to the number NT of Tx antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
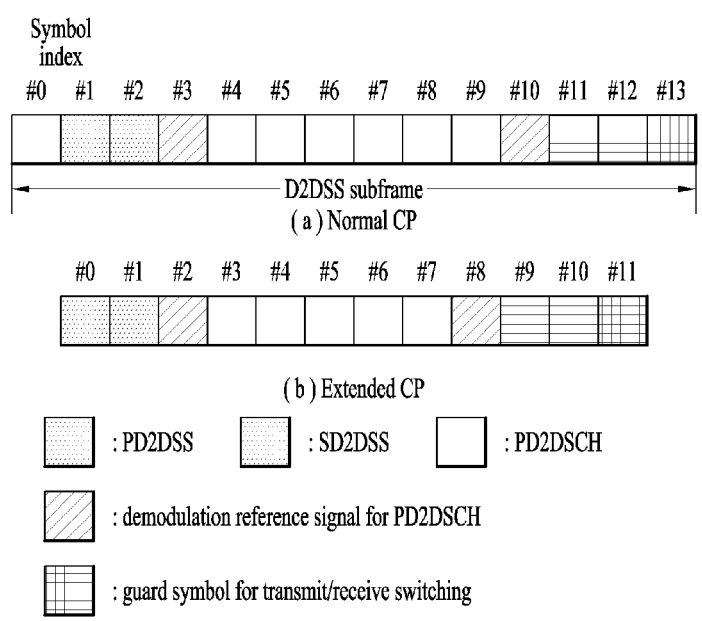
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
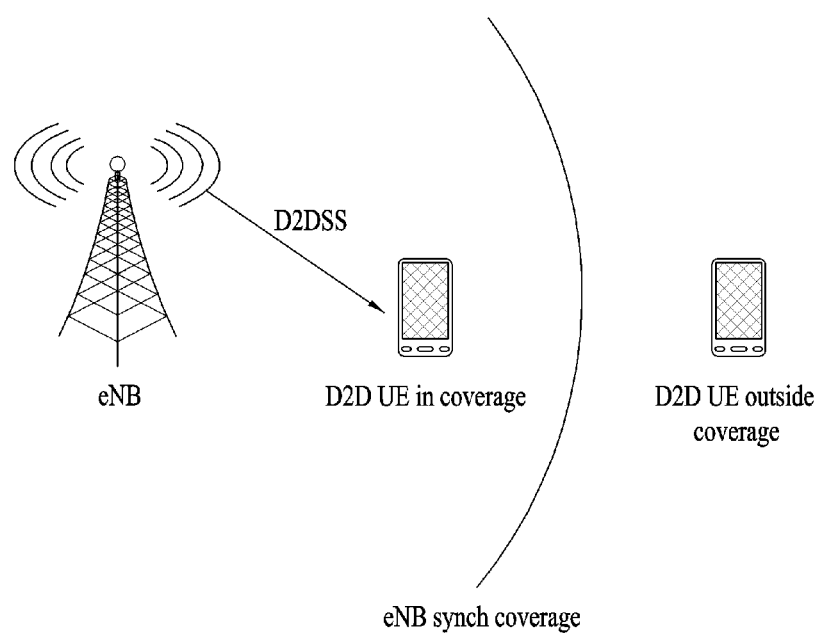
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8:
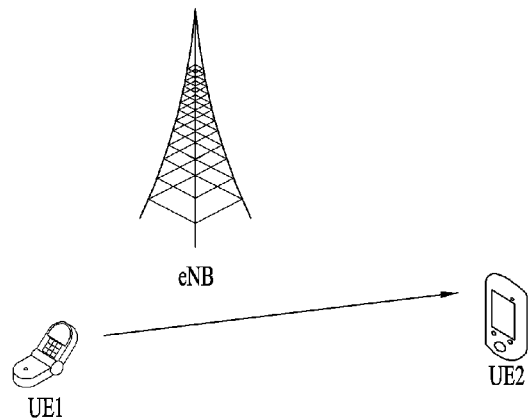
FIG. 8 is a view illustrating an exemplary D2D resource pool for D2D communication.
Figure 8:
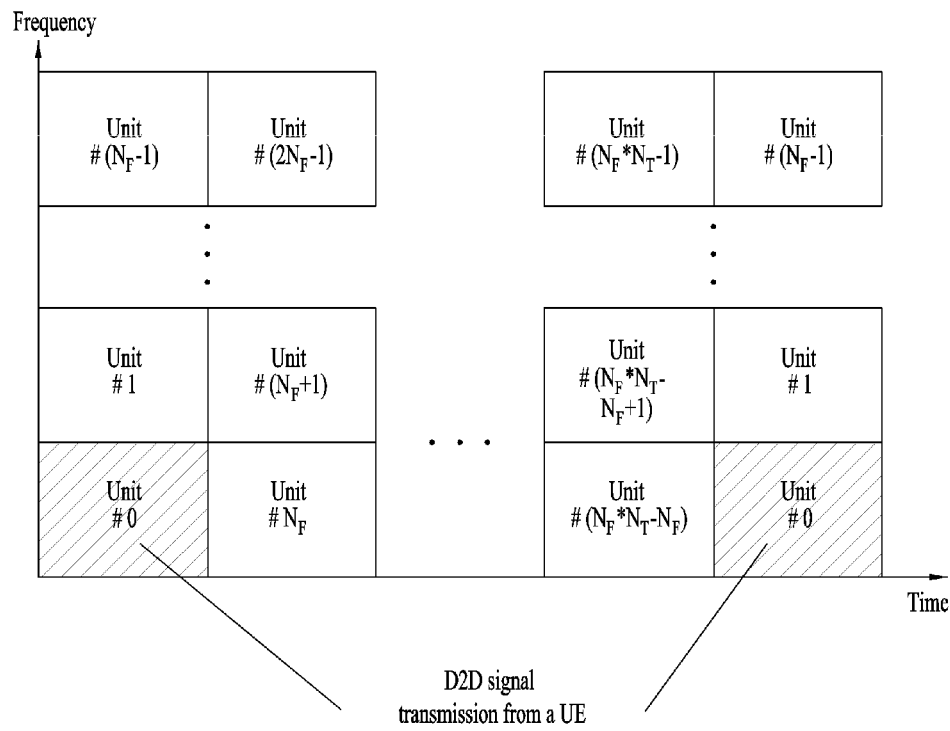

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the NF number of resource units and the entire time resources are divided into the NT number of resource units. In particular, it is able to define NF*NT number of resource units in total. In particular, a resource pool can be repeated with a period of NT subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit an SA (D2D control signal, or sidelink control information (SCI)) in resources configured by an eNB. For a mode-2 UE, the eNB configures resources for D2D transmission. The mode-2 UE may select time-frequency resources from the configured resources and transmit an SA in the selected time-frequency resources.

Figure 9:
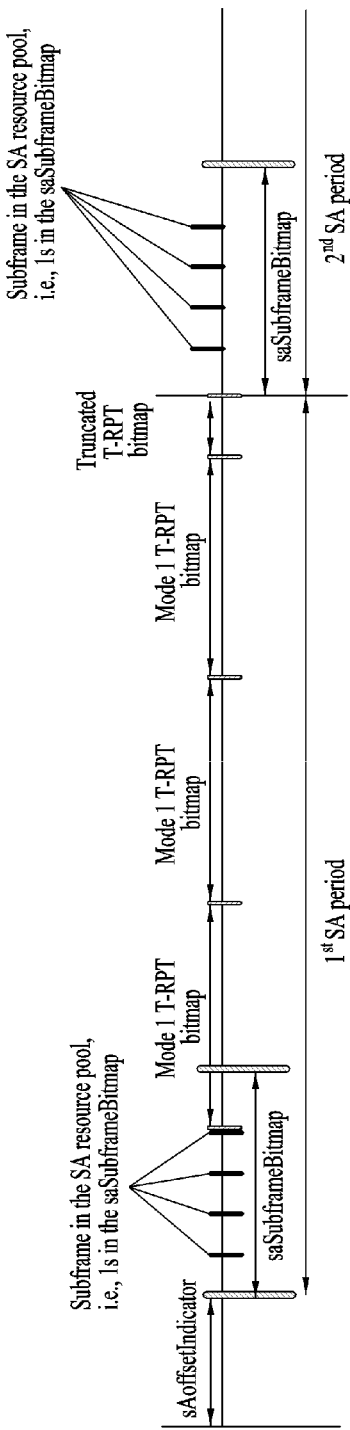
FIG. 9 is a view illustrating a scheduling assignment (SA) period.

An SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in an SA period except for an SA resource pool is larger than the number of T-RPT bits, the T-RPT may be applied repeatedly, and the last applied T-RPT may be truncated to be as long as the number of remaining subframes. A transmitting UE performs transmission at positions corresponding to 1 s set in a T-RPT bitmap in an indicated T-RPT, and transmits one medium access control layer protocol data unit (MAC PDU) four times.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

New Radio Access Technology (New RAT or NR)

As more and more communication devices require a larger communication capacity, there is a need for enhanced mobile broadband communication beyond legacy RAT. In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR.

Figure 10:
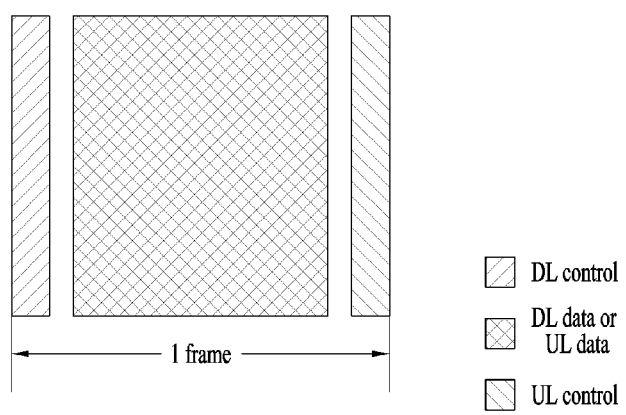
FIGS. 10 and 11 are views illustrating exemplary new radio access technology (NRAT) frame structures.
Figure 11:
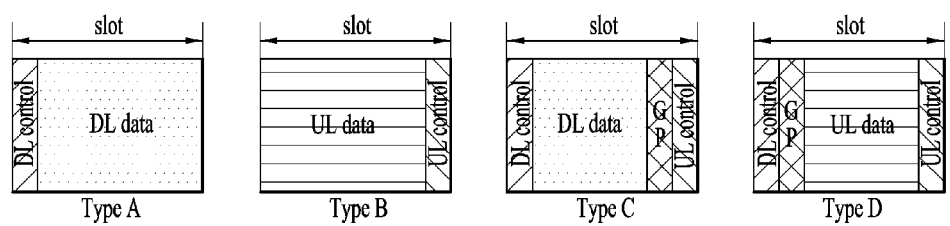

FIG. 10 illustrates an exemplary frame structure available for NR. Referring to FIG. 10, the frame structure is characterized by a self-contained structure in which all of a DL control channel, DL or UL data, and a UL control channel are included in one frame. The DL control channel may deliver DL data scheduling information, UL data scheduling information, and so on, and the UL control channel may deliver ACK/NACK information for DL data, CSI (modulation and coding scheme (MCS) information, MIMO transmission-related information, and so on), a scheduling request, and so on. A time gap for DL-to-UL or UL-to-DL switching may be defined between a control region and the data region. A part of a DL control channel, DL data, UL data, and a UL control channel may not be configured in one frame. Further, the sequence of channels in one frame may be changed (e.g., DL control/DL data/UL control/UL data, UL control/UL data/DL control/DL data, or the like).

Hereinafter, how to control transmission powers of a PSCCH and a PSSCH in D2D transmission, particularly, in transmission mode 3 or 4, according to an embodiment of the present disclosure, will be described. For the contents not described in detail hereinbelow, reference can be made to Clauses 14.1.1.5 and 14.2.1.3 in 3GPP TS 36.213 V15.0.0 (2017-12).

EMBODIMENT

A UE according to an embodiment of the present disclosure may determine the transmission powers of the PSCCH and the PSSCH and transmit the PSCCH and the PSSCH at the determined transmission powers. Herein, if the PSCCH and the PSSCH are transmitted using frequency division multiplexing (FDM) in one subframe and if an MCS level or a modulation order is equal to or higher than a preset value, a power offset value for increasing a transmission power may not be applied upon determination of the transmission power of the PSCCH. Alternatively, the UE may differently determine whether to apply the power offset value to a control signal according to the MCS level or the modulation order.

Alternatively, if the PSCCH and the PSSCH are transmitted using FDM in one subframe and if the MCS level or the modulation order is equal to or higher than the preset value, a power offset value for reducing a transmission power (a minus PSCCH power offset) may be applied or a power offset value for increasing a transmission power which is less than a predetermined value may be applied upon determination of the transmission power of the PSCCH. That is, the UE differently sets a power offset value between a control signal and a data signal according to the MCS level and the modulation order.

Upon determination of the transmission power of the PSCCH, at least a part of available power when the power offset value is not applied may be allocated for increase in the transmission power of the PSSCH. That is, if the PSCCH and the PSSCH are transmitted using FDM and if a high MCS level/modulation order is used, the transmission power of the PSSCH, rather than the transmission power of the PSCCH, is boosted.

With respect to the MCS level, the preset value may be 64-quadrature amplitude modulation (QAM). Specifically, if the UE uses 64-QAM (or a modulation order of a predetermined value or higher), a power offset of the control signal (power of power spectrum density (PSD) value additionally allocated to the control signal based on the data signal) may be set to 1 dB or less (e.g., 0 dB). To effectively receive the data signal in a specific MCS level or higher (to attenuate distortion), the power offset allocated to the control signal is differently set.

Alternatively, if the UE uses 64-QAM (or a modulation order of a predetermined value of more), the power offset may not be applied to the control signal (e.g., PSCCH). This method serves to reduce distortion of the data signal while the signal is received in a high MCS level as in the afore-mentioned method. In addition, since signal-to-noise ratios (SNRs) required for successful decoding of the data signal and the control signal are remarkably different, applying the power offset to the control signal may be meaningless. (At a specific SNR, the control signal may continue to be successfully decoded and the data may continue to fail to be decoded.) Therefore, in order to improve data decoding performance, the power offset may not be applied to the PSCCH or deboosting (minus PSCCH power offset) may be applied to the PSCCH in a specific MCS level/modulation order or higher, instead of additionally allocating power to the control signal, to further increase SNR of the data.

That is, according to the above-described embodiment of the present disclosure, in 3GPP LTE Release-14 Mode 3/4, when the UE simultaneously transmits the control information and data in one subframe and when a high modulation order or MCS level is used, performance degradation caused by a high power boosting value which deteriorates error vector magnitude (EVM) performance of a transmission symbol or in-band or out-band emission may be prevented. This effect will now be described in detail with reference to FIG. 12.

Figure 12:
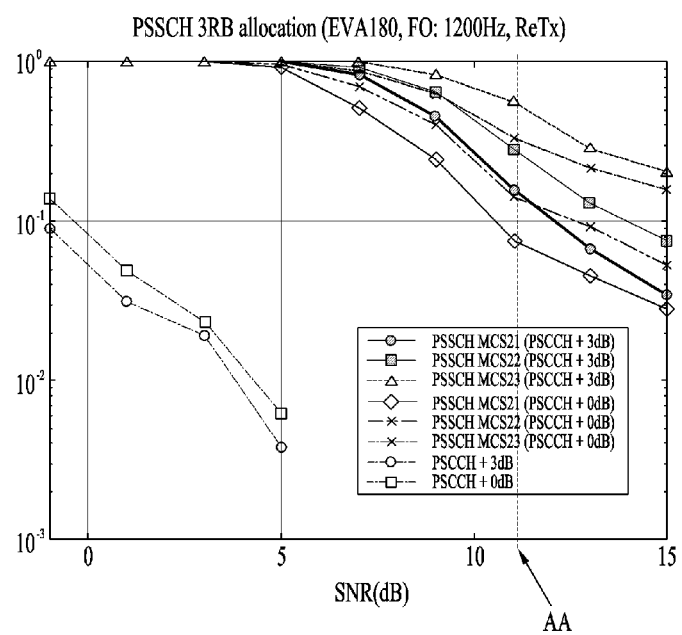
FIG. 12 is a view illustrating a simulation result related to the present disclosure.

FIG. 12 illustrates a block error rate (BLER) according to SNRs of a PSCCH and a PSSCH when 64-QAM is used. An environment used for this simulation is channel model EVA 180, frequency offset 1200 Hz, single transmission (Tx), PSSCH RB size: 3, PSCCH RB size: 2 (note: fixed in 3GPP TS36.211), MCS level: MCS 21/22/23 (note: MCS levels corresponding to 64-QAM), transport block size (TBS) scaling factor: 0.7 (note: a value obtained by multiplying 0.7 by values in TBS table by taking into account a symbol considering DMRS, AGC, and Tx/Rx switching added to sidelink mode 3/4 in a current TBS table).

As a result of the simulation of FIG. 12, an SNR of about 4 dB is required to satisfy a BLER of 0.01 of the PSCCH and an SNR of 10 dB or higher in 64-QAM is required to satisfy a BLER of 0.1 of the PSSCH. Accordingly, at the SNR of 10 dB or higher which satisfies the BLER of the PSSCH, since the data signal will be decoded regardless of whether to apply the power offset, it is not meaningful to apply the power offset to the PSCCH. That is, it is important to keep SNR balance between the control signal and the data signal in order to improve final decoding performance of the data signal. In FIG. 12, in the case of AA, which is a specific SNR, in MCS-21, it may be appreciated that a power offset of 0 dB (i.e., a power offset is not applied) applied to the PSCCH satisfies a BLER of 0.1 as compared with an offset of 3 dB applied to the PSCCH. That is, it is more effective in decoding the PSSCH to apply the power offset of 0 dB to the PSCCH rather than to apply the power offset of 3 dB to the PSCCH. Alternatively, SNR balance between the control signal and the data signal may be kept by allocating as much power as possible to the data.

In summary, power boosting of the PSCCH may not be applied to a specific MCS level/modulation order or higher. Alternatively, a method of applying power deboosting to the PSCCH or power boosting to the PSSCH in a specific MCS level/modulation order or higher is proposed. In this case, a power offset (boosting or deboosting) value used per MCS level or modulation order may be predetermined or may be signaled by a network to a UE.

If the MCS level or modulation order is a preset value or higher, the PSCCH and the PSSCH may be transmitted in different subframes. That is, the UE differently set a subframe offset between the control signal and the data signal according to the MCS level or the modulation order. When the UE uses 64-QAM (or a modulation order of a predetermined level or higher), the UE may set the subframe offset between the control signal and the data signal to a value greater than 0 so that the control signal and the data signal are configured to be always TDMed. In this case, the subframe offset may be predetermined (resource pool specific) by the network or may be signaled to nearby UEs by a transmission UE through a control signal. This method prevents signal distortion occurring during simultaneous transmission of the control signal and the data signal in a specific MCS level or modulation order or higher. In addition, since an application of an excessive MPR may be avoided, coverage of the data signal may also be prevented from being reduced.

However, this method has a possibility of performing data resource decoding on an incorrect resource even when existing UEs decode the control signal. Then, if the existing UEs set reserved bits to values other than predetermined values (e.g., all zeros), the UEs may regard the control signal as a signal which is not correctly decoded and may not perform decoding and sensing operations for the data resource. In other words, the reserved bits may be interpreted only by UEs of a new release and such UEs perform the decoding and sensing (PSSCH RSRP measurement) operations of the data signal in a subframe offset indicated by the reserved bits.

The size of the power offset may be set depending on whether the PSCCH and the PSSCH are continuously transmitted on the frequency axis. That is, the size of the subframe offset/power offset of the control signal and the data signal may be differently set depending on whether the control signal and the data signal are continuous or discontinuous in a frequency region. This is because a required EVM, EVM margin, or MPR may differ according to each case. As a similar principle, the MPR may also be differently set according to whether the control signal and the data signal are continuous in the frequency region. When the control signal and the data signal are continuous in the frequency region, a subframe offset and a power offset between the control signal and the data signal may be set to subframe offset=a and power offset=b. When the control signal and the data signal are discontinuous in the frequency region, the subframe offset and the power offset between the control signal and the data signal may be set to subframe offset=c and power offset=d.

For a UE that uses a specific MCS level or modulation order or higher, an additional control signal resource region and/or a data signal resource region may be configured (by the network through a physical layer or higher layer signal or a preconfigured signal). For example, an additional PSCCH resource region may be configured for a UE using 64-QAM (or a modulation order of a predetermined level or higher). Then, when the PSCCH and the PSSCH are TDMed, the PSSCH is shared by UEs regardless of an MCS level, whereas an additional PSCCH pool is configured for the TDMed PSCCH so that UEs of LTE Release-14 are prevented from performing incorrect PSCCH decoding and prevented from colliding on the PSCCH resource.

When the MCS level or the modulation order is a preset value or higher, an automatic gain control (AGC) period equal to or longer than a predetermined period may be used. Specifically, in order to decode a specific MCS level or modulation order or higher, a longer AGC period may be needed. To this end, the following methods may be considered. When a specific MCS level or higher is decoded (e.g., 64-QAM or higher), data may be mapped to N initial symbols in a subframe by a comb type. (Data may not be mapped to odd-numbered REs. The REs to which data is not mapped may be punctured or rate-matched.) In this case, N may be a predetermined value or a value differently set according to an MCS level. This is because a receiver may accurately and rapidly perform AGC through transmission of symbols of a repeated form and, when AGC is performed in a period of one or more symbols, a period of the remaining symbols may be used to decode data.

The above description is not limited only to D2D direct communication and may also be applied to UL or DL. In this case, an eNB, a relay node, etc. may adopt the proposed methods.

Since examples of the above-described proposed methods may also be included in one of methods of implementing the present disclosure, it is obvious that the examples are regarded as the proposed methods. Although the above-described proposed methods may be independently implemented, some of the proposed methods may be implemented in a combined (aggregated) form thereof. A rule may be defined such that information as to whether the proposed methods are applied (or information about rules of the proposed methods) is indicated to a UE by an eNB through a predefined signal (e.g., a physical layer signal or a higher-layer signal), signaled by a transmission UE to a reception UE, or requested by the reception UE for the transmission UE signal the information.

As an example, when a specific MCS level or modulation order is used, the network may signal whether to apply power boosting to a PSCCH through the physical layer or higher layer signal to the UE. Such signaling may be separately configured per resource region or may be applied to all UEs participating in D2D direct communication. When 64-QAM is used, the network may signal whether to apply a power offset to the PSCCH through the higher layer signal to the UE or whether to apply a power offset to the PSCCH may be preconfigured.

Figure 13:
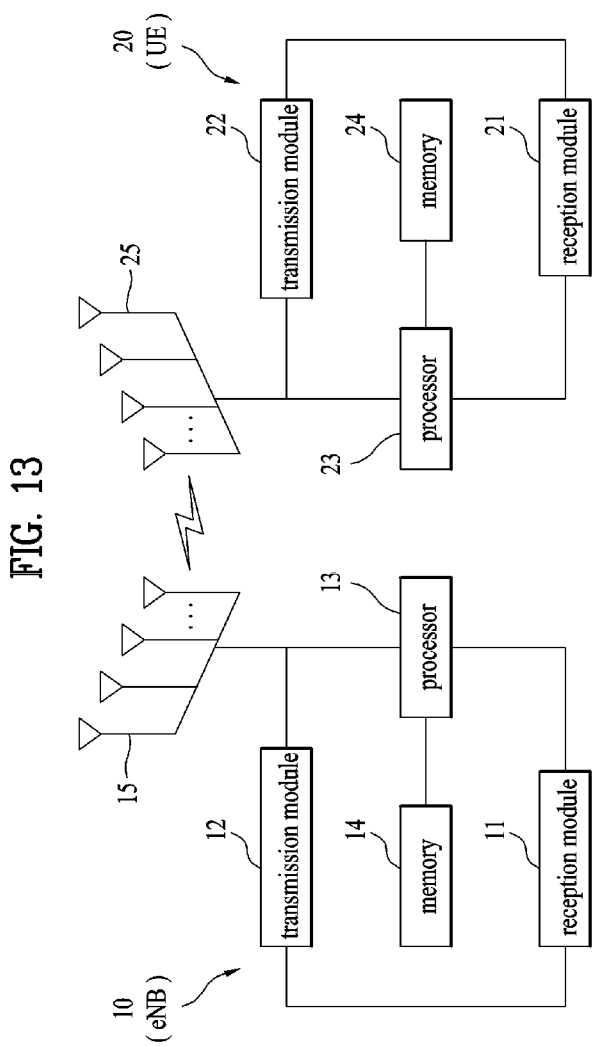
FIG. 13 is a view illustrating a configuration of transmission and reception devices.

Configuration of an Apparatus According to an Embodiment of the Present Disclosure FIG. 13 is a diagram illustrating a configuration of a transmission point and a UE according to an embodiment of the present disclosure.

Referring to FIG. 13, a transmission point 10 according to the present disclosure may include a reception device 11, a transmission device 12, a processor 13, a memory 14, and a plurality of antennas 15. The antennas 15 may support MIMO transmission and reception. The reception device 11 may receive a variety of signals, data, and information on UL from a UE. The transmission device 12 may transmit a variety of signals, data, and information on DL to the UE. The processor 13 may control overall operation of the transmission point 10.

The processor 13 of the transmission point 10 according to an embodiment of the present disclosure may process necessary operations in the above-described embodiments.

The processor 13 of the transmission point 10 processes information received by the transmission point 10 and information to be transmitted to the outside of the transmission point 10. The memory 14 may store the processed information for a predetermined time and may be replaced with a component such as a buffer (not shown).

Referring continuously to FIG. 13, a UE 20 according to the present disclosure may include a reception device 21, a transmission device 22, a processor 23, a memory 24, and a plurality of antennas 25. The antennas 25 may support MIMO transmission and reception. The reception device 21 may receive a variety of signals, data, and information on DL from an eNB. The transmission device 22 may transmit a variety of signals, data, and information on UL to the eNB. The processor 23 may control overall operation of the UE 20.

The processor 23 of the UE according to an embodiment of the present disclosure may process necessary operations in the above-described embodiments. Specifically, the processor may determine transmission powers of a PSCCH and a PSSCH and transmit the PSCCH and the PSSCH at the determined transmission powers through the transmission device. If the PSCCH and the PSSCH are transmitted using FDM in one subframe and if an MCS level or a modulation order is equal to or higher than a preset value, a power offset value for increasing a transmission power may not be applied upon determination of the transmission power of the PSCCH.

The processor 23 of the UE 20 processes information received by the UE 20 and information to be transmitted to the outside of the UE 20. The memory 24 may store the processed information for a predetermined time and may be replaced with a component such as a buffer (not shown).

The above transmission point and UE may be configured in such a manner that the various embodiments of the present disclosure described above may be implemented independently or in combination of two or more thereof. A redundant description is omitted for clarity.

The description of the transmission point 10 in FIG. 13 is identically applicable to a relay as a DL transmitter or a UL receiver, and the description of the UE 20 in FIG. 13 is identically applicable to a relay as a DL receiver or a UL transmitter.

The embodiments of the present disclosure may be implemented through various means, for example, in hardware, firmware, software, or a combination thereof.

In a hardware configuration, the methods according to the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

The invention claimed is:

1. A method of transmitting a sidelink signal by a user equipment (UE) in a wireless communication system, the method comprising:
   determining transmission powers of a physical sidelink control channel (PSCCH) and a physical sidelink shared channel (PSSCH); and
   transmitting the PSCCH and the PSSCH at the determined transmission powers,
   wherein a power offset value for boosting the transmission power of the PSCCH is not applied for determining the transmission power of the PSCCH, based on the PSCCH and the PSSCH being transmitted using frequency-division multiplexing (FDM) in one subframe, and based on a modulation and coding scheme (MCS) level or a modulation order being at least a preset value, and
   wherein the preset value for the MCS level is 64-quadrature amplitude modulation (QAM).

2. The method of claim 1, wherein the PSCCH has a size of two resource blocks (RBs).

3. The method of claim 1, wherein based on the power offset value not being applied for determining the transmission power of the PSCCH:
   at least a part of an available power is allocated for an increase in the transmission power of the PSSCH.

4. The method of claim 1, wherein the size of the power offset value is separately set according to whether the PSCCH and the PSSCH are continuously transmitted on a frequency axis.

5. The method of claim 1, wherein based on the MCS level or the modulation order being at least the preset value, the PSCCH and the PSSCH are transmitted in different subframes.

6. The method of claim 1, wherein based on the MCS level or the modulation order being at least the preset value, an automatic gain control (AGC) period equal to or longer than a predetermined period is used.

7. A user equipment (UE) configured to transmit a sidelink signal in a wireless communication system, the UE comprising:
   a transmission device and a reception device; and
   a processor,
   wherein the processor is configured to determine transmission powers of a physical sidelink control channel (PSCCH) and a physical sidelink shared channel (PSSCH), and transmit the PSCCH and the PSSCH at the determined transmission powers through the transmission device,
   wherein the PSCCH and the PSSCH are transmitted using frequency-division multiplexing (FDM) in one subframe,
   wherein based on a modulation and coding scheme (MCS) level or a modulation order being at least a preset value, a power offset value for boosting the transmission power of the PSCCH is not applied for determining the transmission power of the PSCCH, and
   wherein the preset value for the MCS level is 64-quadrature amplitude modulation (QAM).

8. The UE of claim 7, wherein the PSCCH has a size of two resource blocks (RBs).

9. The UE of claim 7, wherein based on the power offset value not being applied for determining the transmission power of the PSCCH:
   at least a part of an available power is allocated for an increase in the transmission power of the PSSCH.

10. The UE of claim 7, wherein the size of the power offset value is separately set according to whether the PSCCH and the PSSCH are continuously transmitted on a frequency axis.

11. The UE of claim 7, wherein based on the MCS level or the modulation order being at least the preset value, the PSCCH and the PSSCH are transmitted in different subframes.

12. The UE of claim 7, wherein based on the MCS level or the modulation order being at least the preset value, an automatic gain control (AGC) period equal to or longer than a predetermined period is used.

13. The UE of claim 7, wherein the UE is included in an autonomous vehicle.

14. A processing apparatus configured to control a user equipment (UE) to transmit a sidelink signal in a wireless communication system, the processing apparatus comprising:
   at least one processor; and
   at least one computer memory operably connected to the at least one processor and storing instructions that, based on being executed by the at least one processor, perform operations comprising:
   determining transmission powers of a physical sidelink control channel (PSCCH) and a physical sidelink shared channel (PSSCH); and
   transmitting the PSCCH and the PSSCH at the determined transmission powers,
   wherein a power offset value for boosting the transmission power of the PSCCH is not applied for determining the transmission power of the PSCCH, based on the PSCCH and the PSSCH being transmitted using frequency-division multiplexing (FDM) in one subframe, and based on a modulation and coding scheme (MCS) level or a modulation order being at least a preset value, and
   wherein the preset value for the MCS level is 64-quadrature amplitude modulation (QAM).

* * * * *